United States Patent
Ihs

(10) Patent No.: US 10,291,120 B2
(45) Date of Patent: *May 14, 2019

(54) BOOST DC-DC CONVERTER HAVING DIGITAL CONTROL AND REFERENCE PWM GENERATORS

(71) Applicant: Chaoyang Semiconductor Jiangyin Technology Co., Ltd., Jiangyin (CN)

(72) Inventor: Hassan Ihs, San Diego, CA (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,202

(22) Filed: Jul. 5, 2018

(65) Prior Publication Data

US 2018/0316265 A1 Nov. 1, 2018

Related U.S. Application Data

(63) Continuation of application No. 15/376,143, filed on Dec. 12, 2016, now Pat. No. 10,038,375.

(60) Provisional application No. 62/266,186, filed on Dec. 11, 2015.

(51) Int. Cl.
| | |
|---|---|
| *H02M 3/157* | (2006.01) |
| *H02M 3/156* | (2006.01) |
| *H02M 3/158* | (2006.01) |
| *H02M 1/00* | (2006.01) |

(52) U.S. Cl.
CPC ......... *H02M 3/157* (2013.01); *H02M 3/156* (2013.01); *H02M 3/158* (2013.01); *H02M 3/1588* (2013.01); *H02M 2001/0025* (2013.01); *H02M 2003/1566* (2013.01); *Y02B 70/1466* (2013.01)

(58) Field of Classification Search
CPC ......... H02M 3/155–3/1588; H02M 2001/0025
See application file for complete search history.

(56) References Cited

U.S. PATENT DOCUMENTS

| | | | |
|---|---|---|---|
| 7,251,113 B1 | 7/2007 | Batarseh et al. | |
| 7,633,336 B2 * | 12/2009 | Bean ..................... | H03F 3/2173 330/10 |
| 9,647,557 B2 * | 5/2017 | Milanesi ............. | H02M 3/1584 |
| 9,712,053 B2 * | 7/2017 | Ihs ........................ | H02M 3/158 |
| 9,722,490 B2 | 8/2017 | Archibald | |
| 9,735,677 B2 * | 8/2017 | Ihs ........................ | H02M 3/158 |
| 10,038,375 B2 * | 7/2018 | Ihs ........................ | H02M 3/157 |

(Continued)

FOREIGN PATENT DOCUMENTS

WO  WO 2014/187965 A1  11/2014

OTHER PUBLICATIONS

International Search Report on related PCT Application No. PCT/US2016/066218 from International Searching Authority (KIPO) dated Mar. 24, 2017.

(Continued)

*Primary Examiner* — Yusef A Ahmed
(74) *Attorney, Agent, or Firm* — Klein, O'Neill & Singh, LLP

(57) ABSTRACT

A boost DC-DC converter operating in pulse frequency modulation (PFM) and pulse width modulation (PWM) modes includes a plurality of PWM signal generators. The PWM signal generators generate PWM signals with different duty cycles. PWM signals with larger duty cycles may be selected for use in undervoltage situations.

3 Claims, 7 Drawing Sheets

(56) References Cited

U.S. PATENT DOCUMENTS

| | | |
|---|---|---|
| 2005/0001597 A1 | 1/2005 | Walters et al. |
| 2008/0079405 A1 | 4/2008 | Shimizu |
| 2008/0224681 A1 | 9/2008 | Padure et al. |
| 2009/0015217 A1 | 1/2009 | Harriman |
| 2009/0153114 A1* | 6/2009 | Huang ............... H02M 3/1584 323/282 |
| 2011/0043181 A1* | 2/2011 | Jing ................... H02M 3/158 323/288 |
| 2011/0089915 A1* | 4/2011 | Qiu .................... H02M 3/156 323/271 |
| 2011/0241641 A1 | 10/2011 | Chen et al. |
| 2012/0146594 A1* | 6/2012 | Kobayashi ......... H02M 3/1582 323/234 |
| 2013/0027012 A1 | 1/2013 | Huang |
| 2013/0043852 A1 | 2/2013 | Marsili et al. |
| 2013/0278232 A1 | 10/2013 | Herbison |
| 2013/0285626 A1 | 10/2013 | Chen et al. |
| 2014/0035552 A1 | 2/2014 | Dai et al. |
| 2014/0084882 A1* | 3/2014 | Namekawa ........... G05F 1/46 323/271 |
| 2014/0218117 A1* | 8/2014 | Branca ............... H02M 3/158 330/297 |
| 2015/0002116 A1 | 1/2015 | Bernon-Enjalbert et al. |
| 2016/0049871 A1* | 2/2016 | Ihs ..................... H02J 4/00 323/271 |
| 2016/0072500 A1* | 3/2016 | Naka .................. H03K 17/687 323/271 |
| 2016/0094125 A1* | 3/2016 | Milanesi ............ H02M 3/1584 323/271 |
| 2016/0190931 A1* | 6/2016 | Zhang ................ H02M 3/1582 323/271 |
| 2016/0352228 A1* | 12/2016 | Zhang .................. H02M 1/32 |
| 2016/0357242 A1* | 12/2016 | Ihs ...................... G06F 1/324 |
| 2016/0359411 A1* | 12/2016 | Ihs ..................... H02M 3/158 |
| 2016/0359413 A1* | 12/2016 | Ihs ..................... H02M 3/158 |
| 2017/0170728 A1* | 6/2017 | Ihs ..................... H02M 3/157 |
| 2017/0207703 A1* | 7/2017 | Houston ............ H02M 3/1582 |

OTHER PUBLICATIONS

Written Opinion on related PCT Application No. PCT/US2016/066218 from International Searching Authority (KIPO) dated Mar. 24, 2017.

U.S. Appl. No. 15/376,143, filed Dec. 12, 2016, Hassan Ihs, US 2017-0170728 A1, Office Action dated Sep. 8, 2017 Notice of Allowance dated Jan. 17, 2018; Feb. 13, 2018; Apr. 2, 2018.

Extended European Search Report (EESR) on related European Patent Application No. 16874066.0 from the European Patent Office (EPO) dated Nov. 7, 2018.

* cited by examiner

BOOST DC-DC CONVERTER HAVING DIGITAL CONTROL AND REFERENCE PWM GENERATORS

CROSS-REFERENCE TO RELATED APPLICATIONS

This present application is a continuation of U.S. patent application Ser. No. 15/376,143, filed Dec. 12, 2016, which claims the benefit of the filing date of U.S. Provisional Patent Application No. 62/266,186, filed on Dec. 11, 2015, the disclosures of which are incorporated by reference herein.

BACKGROUND OF THE INVENTION

The present invention relates generally to power regulation, and more particularly to power regulation by boost DC-DC switching converters.

DC-DC switching converters generally provide for regulated power to operational circuitry, for example integrated circuits in semiconductor devices. These integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. Complicating matters, some devices may be powered by batteries having relatively small capacities, while the devices themselves, at least at various times, may require large amounts of power.

However, in many cases power requirements of the operational circuitry may vary greatly, and vary greatly within short time frames. Properly controlling converter operation in the face of sudden changes in desired output power may be difficult to accomplish.

BRIEF SUMMARY OF THE INVENTION

Aspects of the invention relate to control of a DC-DC converter. One embodiment provides a digitally controlled boost DC-DC converter, comprising: a high side switch and a low side switch coupled in series, with a first end of an input inductor coupled to a source of power, generally an input voltage source, and a second end of the input inductor coupled to a node between the high side switch and the low side switch, the high side switch having a first end providing a regulated output for a load, with an output capacitor coupled to the first end of the high side switch, the input inductor configured to boost input voltage provided by the source of power and provide a higher voltage to the output capacitor; a first pulse width modulation (PWM) signal generator configured to generate a first PWM signal having a first duty cycle; a second PWM signal generator configured to generate a second PWM signal having a second duty cycle, the second duty cycle greater than the first duty cycle; and logic circuitry to select either the first PWM signal or the second PWM signal for use in controlling the high side switch and the low side switch.

Another embodiment provides a method of controlling a switching boost DC-DC converter, comprising: boosting, by an input inductor, an input voltage provided by a power supply source; providing, by the input inductor, to an output capacitor a boosted voltage; providing, by the output capacitor, an output voltage of the switching boost DC-DC converter based on the boosted voltage; producing, by a first pulse width modulation (PWM) signal generator, a first PWM signal having a first duty cycle; producing, by a second PWM signal generator, a second PWM signal having a second duty cycle, the second duty cycle having a higher duration than the first duty cycle; controlling, by a logic circuitry, states of a high side switch and a low side switch of the switching boost DC-DC converter based on the first PWM signal if the output voltage of the boost DC-DC converter is below a first predefined voltage level; and controlling, by the logic circuitry the states of the high side switch and the low side switch of the switching boost DC-DC converter based on the second PWM signal if the output voltage of the boost DC-DC converter is above the first predefined voltage level.

Another embodiment provides a digitally controlled boost DC-DC converter, comprising: a high side switch and a low side switch coupled in series, with a first end of an input inductor coupled to a source of power and a second end of the input inductor coupled to a node between the high side switch and the low side switch, the high side switch having a first end providing a regulated output for a load, with an output capacitor coupled to the first end of the high side switch, the input inductor configured to boost input voltage provided by the source of power and provide a higher voltage to the output capacitor; a plurality of pulse width modulation (PWM) signal generators each configured to generate a PWM signal having a duty cycle of a different duration; and circuitry to select a one of the PWM signals for use in controlling the high side switch and the low side switch based on a measure of the regulated output.

These and other aspects of the invention are more fully comprehended upon review of this disclosure.

DETAILED DESCRIPTION

Figure 1:
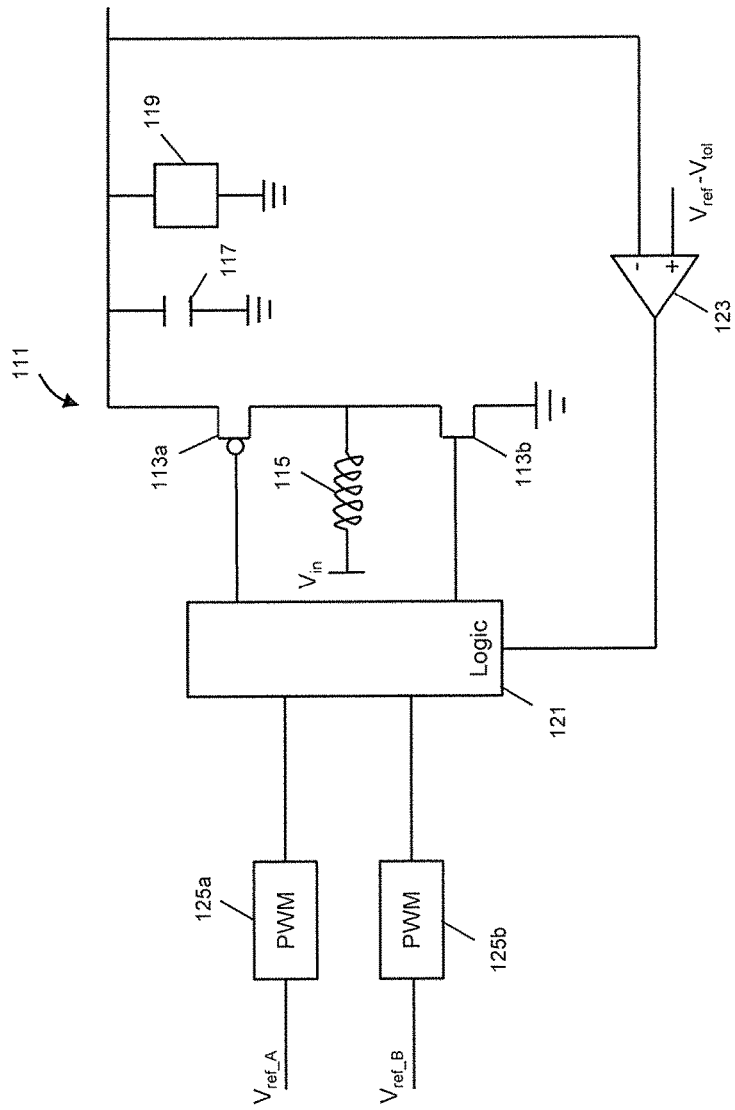
FIG. 1 is a semi-schematic, semi-block circuit diagram of a regulated boost DC-DC converter in accordance with aspects of the invention.

FIG. 1 is a semi-schematic, semi-block circuit diagram of a regulated boost DC-DC converter in accordance with aspects of the invention. The boost DC-DC converter of FIG. 1 operates switches 111 so as to regulate voltage applied to a load 119. In doing so, the converter operates the switches either in accordance with pulse width modulation (PWM) signals generated by either a first PWM generator 125a or a second PWM generator 125b. Selection of which PWM signals to use is based on whether an output voltage of the converter is below a predetermined magnitude, for example as indicated by a comparator 123. In various embodiments the first PWM generator generates signals having a duty cycle less than that of signals generated by the second PWM generator, with signals from the second PWM generator being used if an output voltage of the boost DC-DC converter is lower than a predefined voltage.

In most embodiments the PWM generators generate the PWM signals based on a supply voltage to the boost DC-DC converter, more specifically a fraction of the supply voltage, and one or more reference voltages. In some embodiments the second PWM generator is effectively provided a higher reference voltage for use than the first PWM generator for generating the signals, with the higher reference voltage effectively increasing the duty cycle. In some embodiments the first and second PWM generators determine duty cycles of their respective output signals based on first and second reference voltage signals provided to them, respectively, and the supply voltage, or fraction of the supply voltage, provided to the boost DC-DC converter. In some embodiments the second reference voltage signal provided to the second PWM generator is greater than the first reference voltage signal provided to the first PWM generator. In some embodiments the second reference voltage signal is greater than the first reference voltage signal by a voltage reference adjustment. In some embodiments a magnitude of the voltage reference adjustment is on the order of ten percent of the first reference voltage signal. In some embodiments the first reference voltage signal is a desired output voltage of the boost DC-DC converter. In some embodiments the first reference voltage signal is a desired output voltage of the boost DC-DC converter plus a bias voltage. In some embodiments the bias voltage is on the order of ten percent of the desired output voltage of the boost DC-DC converter.

Accordingly, referring to FIG. 1, the converter includes a high side switch 113a and a low side switch 113b providing the switches 111, an input inductor 115, an output capacitor 117, a logic block 121 for controlling the high side switch 113a and the low side switch 113b, the comparator 123, the first PWM generator 125a, and the second PWM generator 125b.

A first terminal of the high side switch 113a is connected to a first terminal of the output capacitor 117 having a second terminal connected to ground. The output capacitor 117 generally supplies an output voltage to a terminal of the load 119, which is shown as having another terminal connected to ground. A second terminal of the high side switch 113a is connected to a first terminal of the low side switch 113b. A second terminal of the low side switch 113b is connected to a low voltage source, e.g., a ground. Accordingly, the high side switch 113a and the low side switch 113b are connected in series between a node providing the output voltage and the low voltage source. The high side and low side switches 113a and 113b may be formed, for example, with metal-oxide-semiconductor field-effect transistor (MOSFET) transistors, with a p-channel MOS transistor forming the high side switch 113a and an n-channel MOS transistor forming the low side switch 113b, or with bipolar junction transistors (BJTs). In operation either the high side switch is active, the low side switch is active, or neither switch is active.

A first terminal of the input inductor 115 is connected to a power supply source, for example, an input voltage source. A second terminal, an input terminal, of the input inductor 115 is connected to a node between the high side switch 113a and the low side switch 113b. In some embodiments, the input inductor may serve to boost input voltage provided by the power supply source, for example when the low side switch is active, and provide a higher voltage to the output capacitor 117, for example when the high side switch is active.

The comparator 123 receives as inputs the output of the output capacitor and a reference voltage. The reference voltage has a magnitude equal to the desired output voltage of the boost DC-DC converter, minus a tolerance amount. In general, it is preferred that the boost DC-DC converter provide an output voltage equal to the reference voltage, but not lower than the reference voltage minus the tolerance amount. The comparator is configured to produce a signal indicating whether the output voltage of the boost DC-DC converter is greater than or less than the reference voltage minus the tolerance amount. In some embodiments, the comparator 123 may output a high signal when the output voltage is lower than the reference voltage minus the tolerance amount, and output a low signal otherwise.

The first and second PWM generators 125a and 125b are generally utilized to generate PWM signals to be used to operate the high side and low side switches. The first and second PWM generators generally produce a series of pulses based on a frequency and a duty cycle of the PWM generators, for example based on reference voltages and output voltage of the boost DC-DC converter. Accordingly, FIG. 1 shows the first PWM generator receiving a reference voltage $V_{ref\_A}$ and the second PWM generator receiving a reference voltage $V_{ref\_B}$. In some embodiments $V_{ref\_A}$ is the desired output voltage of the boost DC-DC converter plus a bias offset, which may be for example about ten percent of the desired output voltage of the boost DC-DC converter. In some embodiments $V_{ref\_B}$ is $V_{ref\_A}$ plus an adjustment amount, which, similar to the bias offset, also may be for example about ten percent of the desired output voltage. In addition, although not illustrated in FIG. 1, in most embodiments the first and second PWM generators also receive a signal indicative of the voltage supplied to the boost DC-DC converter.

Figure 6:
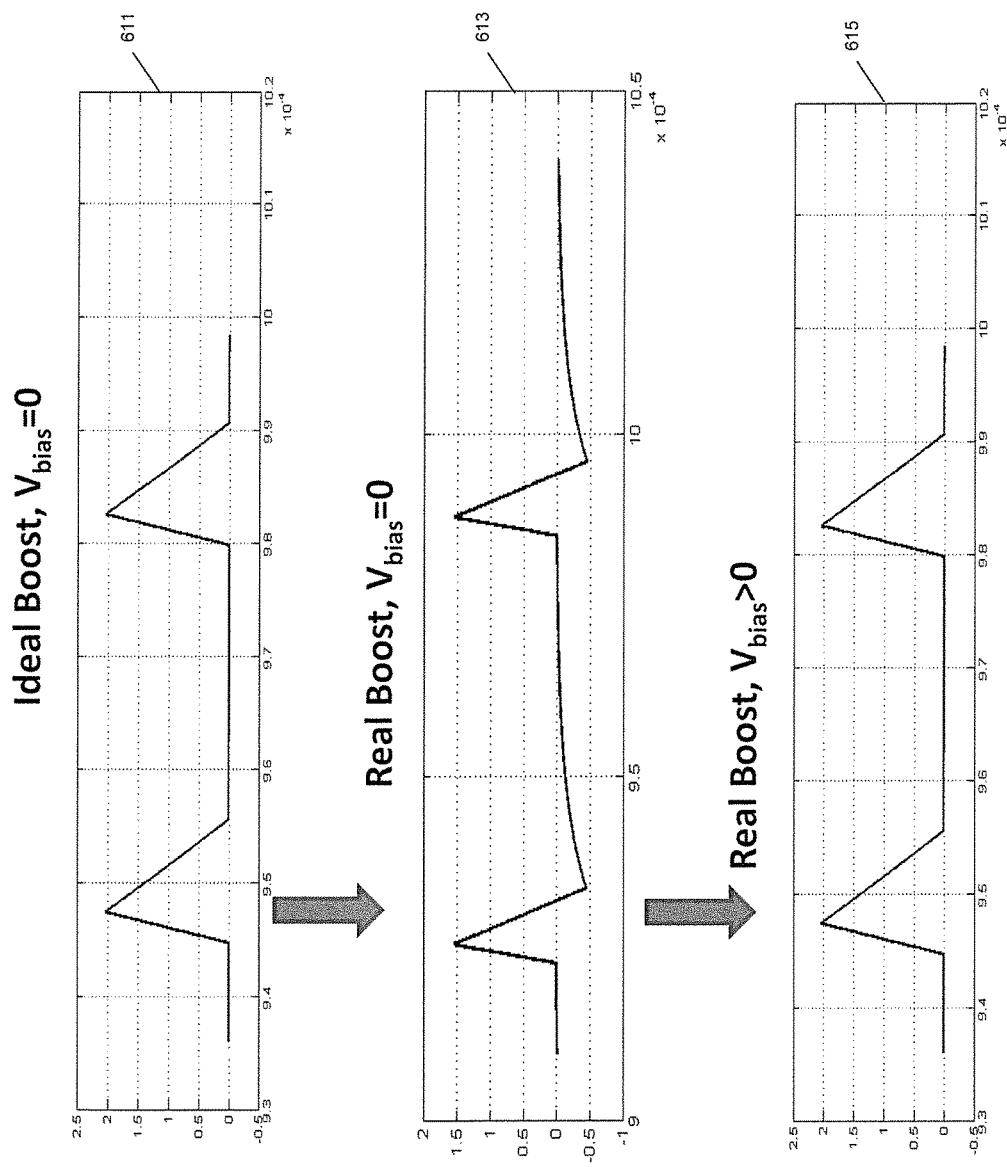
FIG. 6 provides a series of charts illustrating effects of use of a bias voltage for modifying operation of a converter in accordance with aspects of the invention.

An example of usefulness of adjusting the reference voltage to include the bias offset may be comprehended considering the charts of FIG. 6. The charts of FIG. 6 illustrate inductor current with respect to time. A first chart 611 shows pulse frequency modulated inductor current for an ideal boost converter. For the ideal boost converter the inductor current remains positive throughout operation, with the inductor current returning to zero between pulses. A second chart 613, however, shows that for a real boost converter, having resistive losses associated with the inductor, inductor current reverses and goes negative about the end of each pulse. The negative inductor current may be reduced or avoided through compensating the reference voltage by the bias offset, as shown in a third chart 615.

The logic block 121 may receive the signal produced by the comparator 123, and the pulses produced by the first and second PWM generators to control state of the high side and low side switches 113a and 113b. The logic block 121 generally controls the state of the high and low side switches 113a and 113b by way of forming control signals for controlling those switches. In various embodiments the logic block effectively passes signals from the first PWM generator to the high side and low side switches if the boost DC-DC converter output voltage is greater than the reference voltage minus the tolerance amount, and effectively passes signals from the second PWM generator to the high side and low side switches if the boost DC-DC converter output voltage is less than the reference voltage minus the tolerance amount. As the signals from the second PWM generator have an increased duty cycle time as compared to the signals from the first PWM generator, the high side switch is active for greater amounts of time, allowing for provision of increased power by the boost DC-DC converter.

Figure 2:
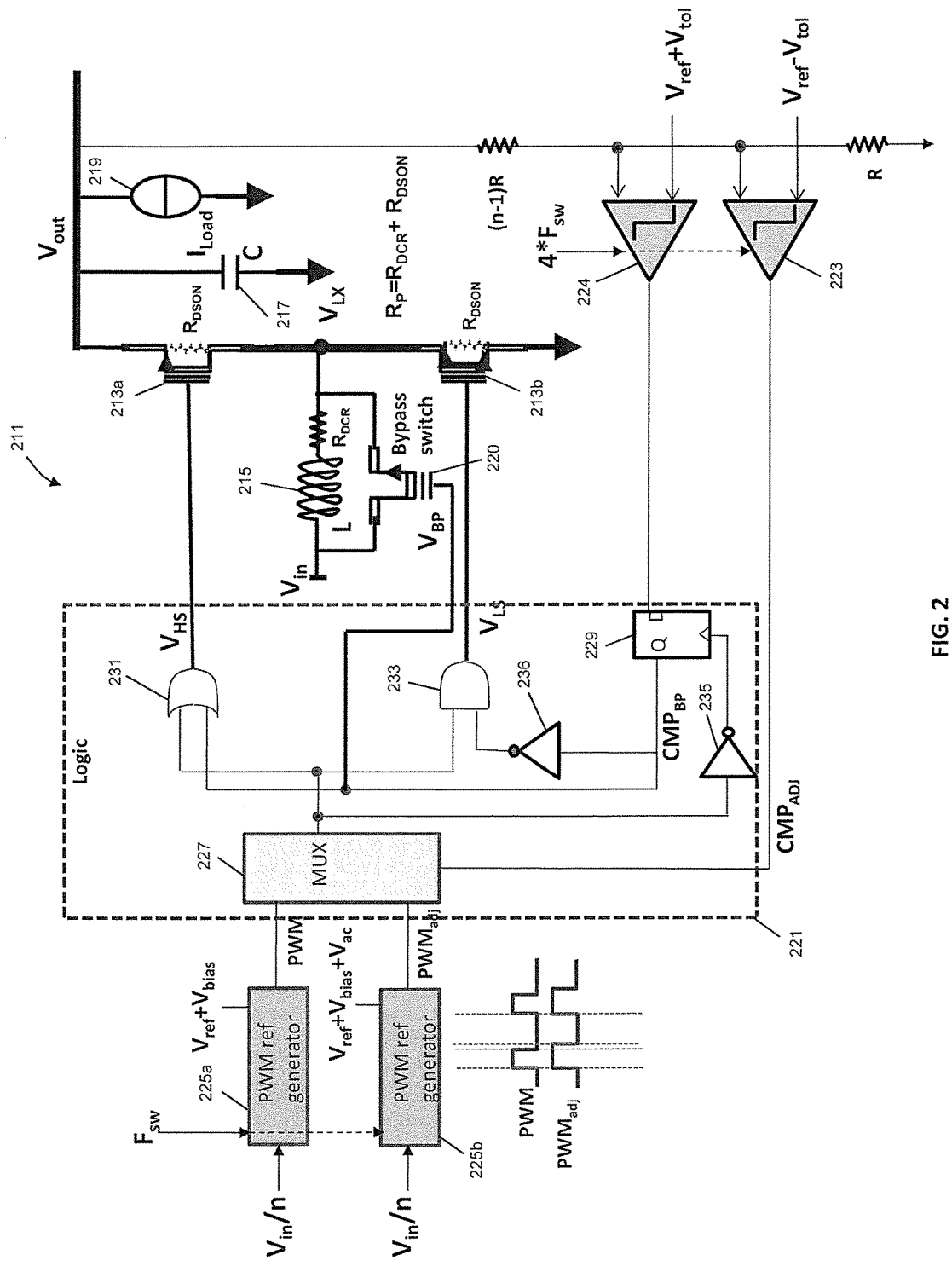
FIG. 2 is a semi-schematic, semi-block diagram of a further regulated boost DC-DC converter including circuitry of a logic block in accordance with aspects of the invention.

FIG. 2 is a semi-schematic, semi-block diagram of a further regulated boost DC-DC converter including circuitry of a logic block in accordance with aspects of the invention. The boost DC-DC converter of FIG. 2 is similar to the boost DC-DC converter of FIG. 1.

As illustrated in FIG. 2, the converter 211 includes a high side switch 213a, a low side switch 213b, a bypass switch 220, an input inductor 215, an output capacitor 217, a power load 219, a logic circuitry 221 for controlling the high side, low side, and bypass switches, a first comparator 223, a second comparator 224, a first pulse-width modulation (PWM) generator 225a, and a second PWM generator 225b.

The input inductor 215 has one end coupled to a first voltage source and also to a first end of the bypass switch 220. Another end of the input inductor is coupled to a node between the high side switch 213a and the low side switch 213b, and also to a second end of the bypass switch. For illustrative purposes, the other end of the input inductor 215 also shows a resistance ($R_{DCR}$) provided by the input inductor and associated circuit paths, e.g., a parasitic effect. The input inductor generally serves to boost input voltage supplied by the first voltage source, for example when gate input of the low side switch is high, and supply a boosted voltage to the output capacitor, for example when gate input of the high side switch is low.

The high side switch 213a and the low side switch 213b are coupled in series between a first end of the output capacitor 217 and a second voltage source. The output capacitor generally provides an output voltage to a first end of the power load 219, with a load current $I_{Load}$ passing through the power load. The first voltage source is at a higher voltage than the second voltage source. For illustrative purposes, the high side and low side switches also show a resistance ($R_{DSON}$) provided by the switches. A node coupling the first end of the output capacitor and the first end of the power load generally may be considered the output of the boost DC-DC converter.

The first comparator 223 and the second comparator 224 generally have a first input coupled to the output node, their second inputs coupled to reference voltages, and the comparators configured to determine which input is greater. With respect to the first comparator 223, the reference voltage, for example, may be a desired output voltage of the boost DC-DC converter minus a tolerance voltage. The first comparator therefore determines whether the output voltage of the boost DC-DC converter is less than or greater than a desired output voltage minus a tolerance voltage. With respect to the second comparator 224, the reference voltage may be the desired output voltage of the boost DC-DC converter plus a tolerance voltage. The second comparator therefore determines whether the output voltage of the boost DC-DC converter is greater than or less than the desired output voltage plus the tolerance voltage.

The first PWM generator 225a and the second PWM generator 225b generally generate signals to control operation of the high side and low side switches, based on reference input signals and a signal indicative of voltage supplied to the boost DC-DC converter. In various embodiments the PWM generators generate the signals with a duty cycle dependent on the reference input signals and the signal indicative of voltage supplied to the boost DC-DC converter. In some embodiments, the reference input signal of the first PWM generator 225a may be a sum of the desired output voltage of the boost DC-DC converter and a bias voltage. In some embodiments, the reference input voltage signal of the second PWM generator 225b may be a sum of the desired output voltage of the boost DC-DC converter, the bias voltage, and a voltage offset. In some embodiments, the voltage offset is equal to or approximately 10% of the reference voltage. As illustrated in FIG. 2, in some embodiments, the signals generated by the second PWM generator 225b (which may be referred to as $PWM_{adj}$) have a duty cycle greater than that of the signals generated by the first PWM generator 225a (which may be referred to as PWM). Accordingly, as the signals indicate relative duration for which the high side switch is active, the high side switch is active for a longer period of time when the $PWM_{adj}$ signals are used compared to than when the PWM signals are used.

The logic circuitry 221 may receive the output signals from the first and second comparators, and the signals generated by the first and second PWM generators to control states of the high side, low side, and bypass switches. In some embodiments, the logic circuitry 221 may be implement circuitry of the logic block 121 of FIG. 1. The logic circuitry 221 generally controls the states of the high side, low side, and bypass switches by way of producing control signals for controlling those switches. Referring to FIG. 2, the logic circuitry 221 includes a multiplexer 227 which receives the PWM and PWMadj signals, and selects one of them for use based on an output $CMP_{ADJ}$ of the first comparator 223.

As shown in FIG. 2, a latch 229 stores the signal produced by the second comparator 224. An output of the multiplexer 227 is provided to the latch, after passing through a first inverter 235. The latch stores the signal when the output of the multiplexer, indicating an end of the duty cycle of the converter switches, transitions to a low state. An output of the latch is provided to a gate of the bypass switch, an OR gate 231 and, after passing through a second inverter 236, to an AND gate 233. The OR gate also receives the output of the multiplexer, and provides an output to a gate of the high side switch. The high side switch, active when its gate input is low, is therefore active when both the output of the multiplexer and the output of the latch are low. The AND gate also receives the output of the multiplexer, and provides an output to a gate of the low side switch. The low side switch, active when its gate input is high, is therefore active when the inverted latch output is high and the output of the multiplexer is high.

Figure 7:
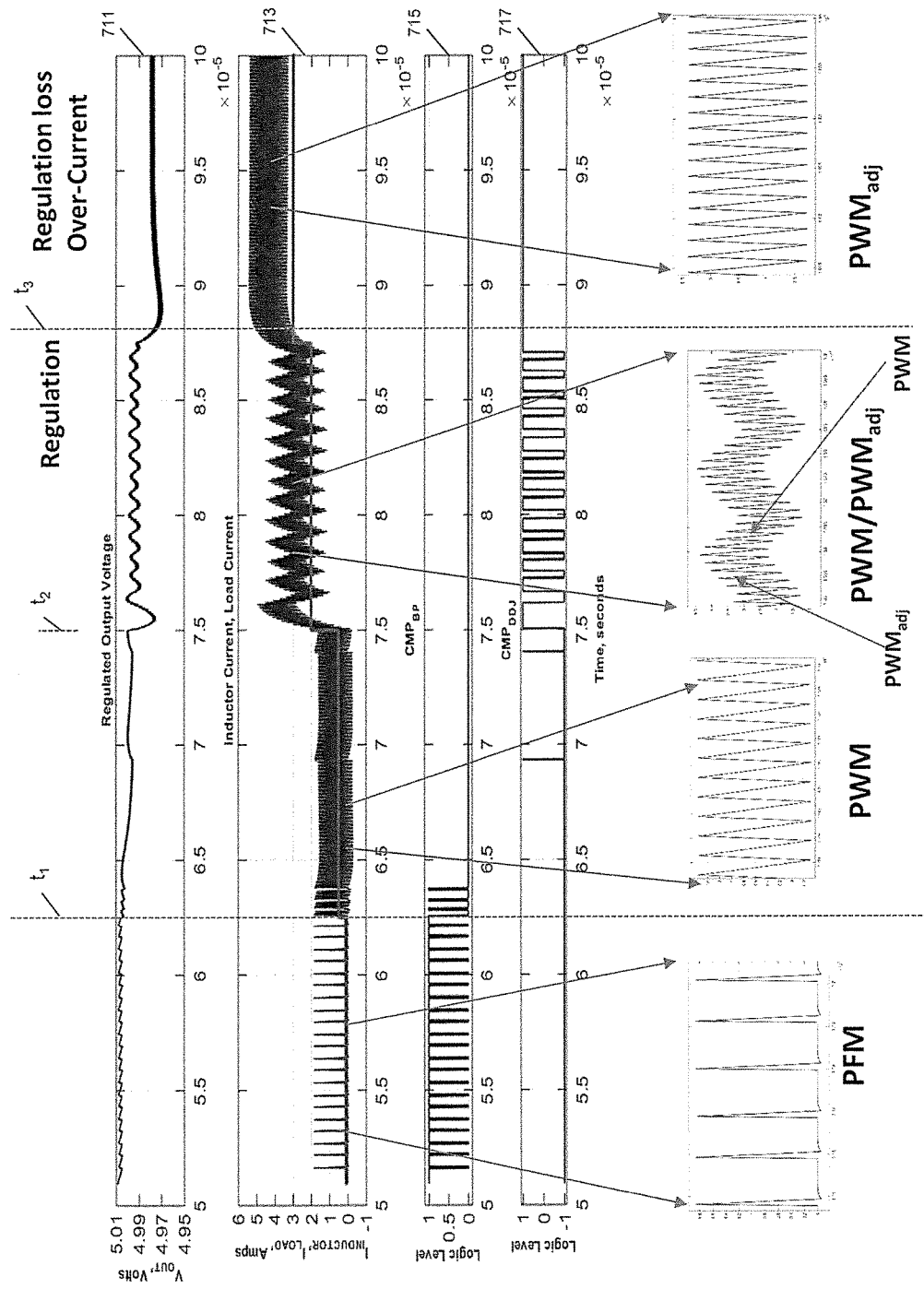
FIG. 7 provides charts illustrating operation of a boost DC-DC converter in accordance with aspects of the invention under various load conditions.

FIG. 7 provides a series of charts indicating status of a boost DC-DC converter, for example the boost DC-DC converter of FIG. 2, in operation. Each of the charts has a common time frame along their x-axis. A first chart 711 shows regulated converter output voltage and a second chart 713 shows both inductor current and load current. A third chart 715 shows status of the $CMP_{BP}$ signal, indicating an overvoltage situation in which the bypass switch is active, and a fourth chart 717 shows status of the $CMP_{ADJ}$ signal, indicating an undervoltage situation in which the $PWM_{adj}$ signals, instead of the PWM signals, are used to control the converter switches.

During a first time period, until a time t1, the load is drawing some current, and the output voltage periodically overshoots desired output voltage. Consequently, the $CMP_{BP}$ signal periodically goes high, with the converter bypass switch becoming active and interrupting operation of the high side and low side switches. In such a situation, the converter is effectively operating in a pulse frequency modulation mode, as shown in a first exploded view of the inductor current.

At time $t_1$ the load begins to draw a greater amount of current, the output voltage drops slightly, and the $CMP_{BP}$ signal generally no longer goes high. In general the output voltage does not drop sufficiently to cause the $CMP_{ADJ}$ signal to go high, so the converter operates the high side and low side switches using signals from the PWM generator.

At time $t_2$ the load begins to draw a greater amount of current versus that at time $t_1$. Fluctuations in the output voltage cause the $CMP_{ADJ}$ signal to alternate between high and low states, resulting in alternating operation of the high side and low side switches with signals from the PWM generator and signals from the $PWM_{adj}$ generator.

At time $t_3$ the load begins to draw an even greater amount of current, sufficiently large that the converter does not maintain the output voltage in regulation limits. In such a circumstance, the $CMP_{ADJ}$ signal goes and stays high, and the high side and low side switches operate solely in accordance with signals from the $PWM_{adj}$ generator.

Figure 3:
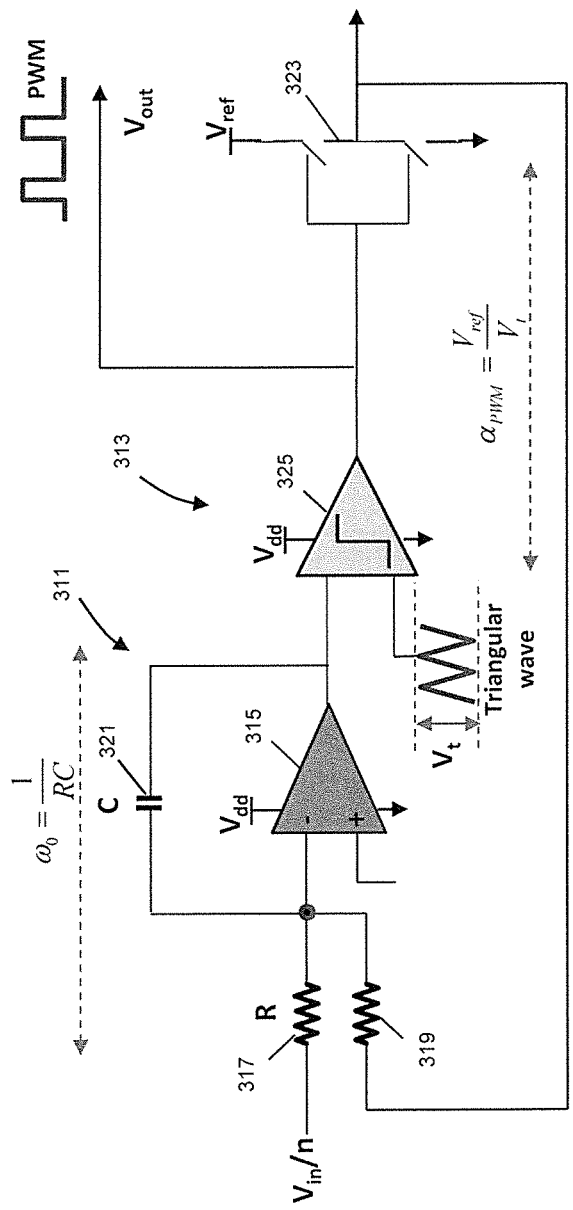
FIG. 3 is a semi-schematic, semi-block diagram of a PWM generator in accordance with aspects of the invention.

FIG. 3 is a semi-schematic, semi-block diagram of a PWM generator in accordance with aspects of the invention. The PWM generator generally provides a first order unconditionally stable loop. The loop provides an output PWM duty cycle which tracks variations in input supply voltage such that application of the PWM duty cycle will yield a desired output voltage. In some embodiments the PWM generator of FIG. 3 is used as the PWM generators of the embodiments of FIGS. 1 and 2, as well as FIG. 5 (later discussed herein).

The PWM generator of FIG. 3 includes an integrator portion 311 and a gain portion 313. The integrator portion integrates an error between a reference voltage and an output signal of the PWM generator. In the embodiment of FIG. 3 the integrator portion comprises an operational amplifier circuit having a capacitor 321 coupled between an output of an operational amplifier 315 and its inverting input. Also coupled to the inverting input are a reference voltage, by way of a first resistor 317 having a resistance R, and an output of the PWM generator, by way of a second resistor 319, also having a resistance R. The reference voltage may be as discussed with respect to the other figures, for example the reference voltage may be a desired output voltage of the boost DC-DC converter plus a voltage tolerance, or the desired output voltage plus a voltage adjustment.

Output of the integrator is provided to the gain portion. The gain portion includes a comparator 325, which also receives a triangular wave input having height of $V_t$. As the integrator and the comparator operate using a supply voltage $V_{dd}$, while tracking of PWM duty cycle with respect to variations in boost DC-DC converter reference voltage $V_{in}/n$ is desired, output of the comparator is provided to an inverter 323. The inverter provides a PWM output signal, which as mentioned above, is also fed back to the operational amplifier, as scaled by the resistor 319.

Figure 4:
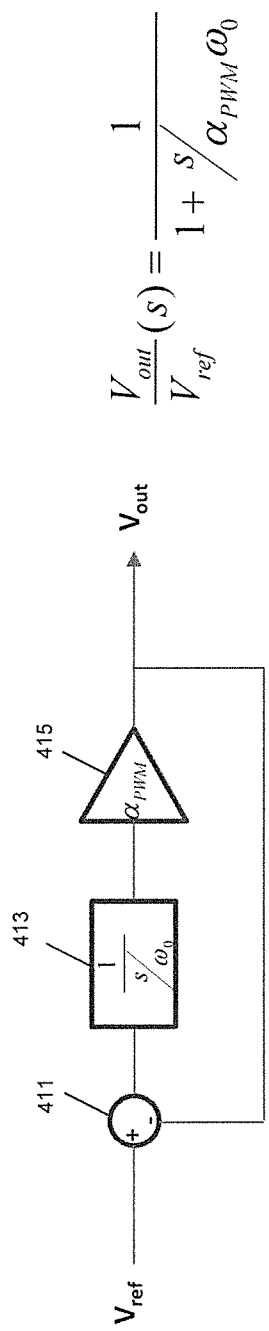
FIG. 4 is a block diagram of the PWM generator of FIG. 3.

A block diagram and associated transfer function for the PWM generator of FIG. 3 are provided in FIG. 4. The reference voltage and feedback from output of the PWM generator are provided to a subtractor, which subtracts the feedback from the reference voltage. The result is provided to an integrator 413, with output of the integrator amplified by a gain block 415, which provides the output of the PWM generator.

Figure 5:
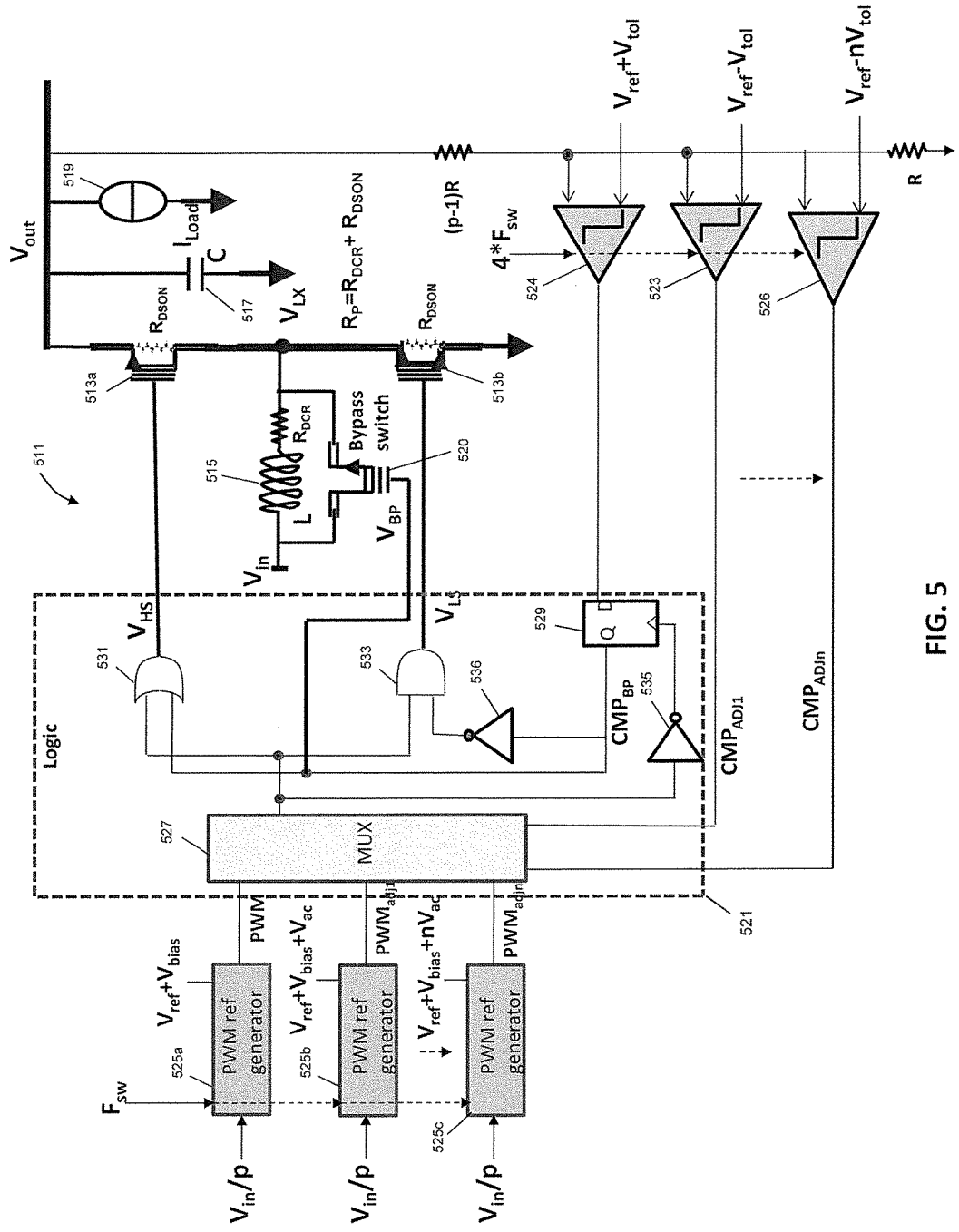
FIG. 5 is a semi-schematic, semi-block diagram of a further regulated boost DC-DC converter in accordance with aspects of the invention.

FIG. 5 is a semi-schematic, semi-block diagram of a further regulated boost DC-DC converter in accordance with aspects of the invention. As illustrated in FIG. 5, the converter 511 includes a high side switch 513a, a low side switch 513b, a bypass switch 520, an input inductor 515, an output capacitor 517, a power load 519, a controller circuitry 521 for controlling the high side, low side, and bypass switches, a voltage overshoot detector 524, a plurality of voltage undershoot detectors, a pulse-width modulation (PWM) generator 525a, and a plurality of scaled PWM generators. In general, the embodiment of FIG. 5 is largely the same as the embodiment of FIG. 2. The embodiment of FIG. 5, however, includes a PWM generator and a plurality of scaled PWM generators. Outputs of the secondary PWM generators are selected for use in controlling the regulator switches depending on where an output voltage of the converter falls in a plurality of voltage ranges.

The input inductor 515 has one end coupled to a first voltage source, for example a power supply source, and also to a first end of the bypass switch 520. Another end of the input inductor is coupled to a node between the high side switch 513a and the low side switch 513b, and also to a second end of the bypass switch 520. For illustrative purposes, the other end of the input inductor 515 also shows a resistance ($R_{DCR}$) provided by the input inductor and associated circuit paths, e.g., a parasitic effect. As with the boost DC-DC converter of FIG. 2, the high side switch 513a and the low side switch 513b are coupled in series between a first end of the output capacitor 517 and a second voltage source, for example a ground. The output capacitor provides an output voltage to the power load 519. The first voltage source is at a higher voltage than the second voltage source. For illustrative purposes, the high side and low side switches also show a resistance ($R_{DSON}$) provided by the switches. A node coupling the first end of the output capacitor, and the first end of the power load generally may be considered the output of the boost DC-DC converter. In some embodiments, the input inductor may serve to boost input voltage supplied by the first voltage source, for example when the low side switch is active, and provide the output capacitor a higher voltage, for example when the high side switch is active.

The voltage overshoot detector 524 and each of the plurality of the voltage undershoot detectors (e.g., a first voltage undershoot detector 523 and a second voltage undershoot detector 526) generally have a first input coupled to the output node, their second inputs coupled to reference voltages, and the detectors are configured to determine which input is greater. The plurality of the voltage undershoot detectors, for example, may allow the boost DC-DC converter to determine whether a reference voltage, at various magnitudes, is greater than or less than the voltage at the output node. With respect to the voltage overshoot detector 524, the reference voltage, for example, may be a sum of a desired output voltage of the boost DC-DC converter and a tolerance voltage. The voltage overshoot detector, therefore, determines whether the output voltage of the boost DC-DC converter is less than or greater than a desired output voltage plus a tolerance voltage. With respect to each of the plurality of the voltage undershoot detectors, the reference voltage may be the desired output voltage of the boost DC-DC converter minus a product of the tolerance voltage and a predetermined value. The predetermined value generally ranges from 1 to n, where n represents the number of voltage undershoot detectors in the boost DC-DC converter. As shown in the embodiment of FIG. 5, the converter 511 has two voltage undershoot detectors, the first voltage undershoot detector 523 and the second voltage undershoot detector 526. Accordingly, in such embodiment, n would equal to two with the predetermined value ranging from 1 to 2.

The PWM generator 525a and each of the plurality of the scaled PWM generators generally generate signals to control operation of the high side and low side switches, based on reference input signals and a signal indicative of input voltage of the boost DC-DC converter. In various embodiments, the PWM generators generate the signals with a duty cycle dependent on the reference input signals and the signal indicative of voltage supplied to the boost DC-DC converter. In some embodiments, the reference input signal of the PWM generator 525a may be a sum of the desired output voltage of the boost DC-DC converter and a bias voltage. In some embodiments, the reference input voltage signal of each of the plurality of the scaled PWM generators (e.g., a first scaled PWM generator 525b and a second scaled PWM generator 525c) may be a sum of the desired output voltage of the boost DC-DC converter, the bias voltage, and a product of a voltage offset and the predetermined value (as previously discussed with respect to the voltage undershoot detectors). In many embodiments, the number of scaled PWM generators is equivalent to the number of voltage undershoot detectors in the boost DC-DC converter, with a one-to-one correspondence between the plurality of the scaled PWM generators and the plurality of the voltage undershoot detectors based on the predetermined value. Accordingly, in many embodiments, the predetermined value is also equivalent to the number of scaled PWM generators in the boost DC-DC converter. In some embodiments, the voltage offset is equal to or approximately ten percent of the reference voltage. In some embodiments, the signals generated by each of the plurality of the scaled PWM generators (which may be referred to as PWMadj1 . . . PWMadjn) have a duty cycle greater than that of the signals generated by the PWM generator 525a (which may be referred to as PWM). Accordingly, as the signals indicate relative duration for which the high side switch is active, the high side switch is active for a longer period of time when the PWMadj1 . . . PWMadjn signals are used compared to than when the PWM signals are used. In some embodiments, the signals generated by one scaled PWM generator have a duty cycle greater than that of the signals generated by another scaled PWM generator, depending on the predetermined value associated with each scaled PWM generator. For example, in the embodiment of FIG. 5, the signals generated by the second scaled PWM generator 525c would have a duty cycle greater than that of the signals generated by the first scaled PWM generator 525b.

The controller circuitry 521, in some embodiments, is similar to or the same as the logic circuitry 221 of FIG. 2. The controller circuitry 521 may receive the output signals from the voltage overshoot detector 524 and the plurality of the voltage undershoot detectors, and the signals generated by the PWM generator 525a and the plurality of the scaled PWM generators to control states of the high side, low side, and bypass switches. The controller circuitry 521 generally controls the states of the high side, low side, and bypass switches by way of producing control signals for controlling those switches. Referring to FIG. 5, the controller circuitry 521 includes a selector 527 which receives the PWM and PWMadj1 . . . PWMadjn signals, and selects one of them for use based on outputs $CMP_{ADJ1}$ . . . $CMP_{ADJn}$ of the plurality of the voltage undershoot detectors.

As shown in FIG. 5, the latch 529 stores the signal produced by the voltage overshoot detector 524. An output of the selector 527 is provided to the latch, after passing through a first inverter 535. The latch stores the signal when the output of the selector, indicating an end of the duty cycle of the converter switches, transitions to a low state. An output of the latch is provided to a gate of the bypass switch, an OR gate 531 and, after passing through a second inverter 536, to an AND gate 533. The OR gate also receives the output of the selector, and provides an output to a gate of the high side switch. The high side switch, active when its gate input is low, is therefore active when both the output of the selector and the output of the latch are low. The AND gate also receives the output of the selector, and provides an output to a gate of the low side switch. The low side switch, active when its gate input is high, is therefore active when the inverted latch output is high and the output of the selector is high.

Although the invention has been discussed with respect to various embodiments, it should be recognized that the invention comprises the novel and non-obvious claims supported by this disclosure.

What is claimed is:

1. A method of controlling a switching boost DC-DC converter, comprising:
   boosting, by an input inductor, an input voltage provided by a power supply source;
   providing, by the input inductor, to an output capacitor a boosted voltage;
   providing, by the output capacitor, an output voltage of the switching boost DC-DC converter based on the boosted voltage;
   producing, by a first pulse width modulation (PWM) signal generator, a first PWM signal having a first duty cycle;
   producing, by a second PWM signal generator, a second PWM signal having a second duty cycle, the second duty cycle having a higher duration than the first duty cycle;
   determining that the output voltage of the switching boost DC-DC converter is below a first predefined voltage level, wherein the first predefined voltage level is a desired boost DC-DC converter output voltage minus a first voltage tolerance;
   controlling, by a logic circuitry, states of a high side switch and a low side switch of the switching boost DC-DC converter based on the first PWM signal in response to determining that the output voltage of the switching boost DC-DC converter is below the first predefined voltage level; and
   determining that the output voltage of the switching boost DC-DC converter is above the first predefined voltage level;
   controlling, by the logic circuitry the states of the high switch and the low side switch of the switching boost DC-DC converter based on the second PWM signal in response to determining that the output voltage of the switching boost DC-DC converter is above the first predefined voltage level;
   wherein the high side switch and the low side switch are coupled in series, with a node between the high side switch and the low side switch coupling to the input inductor of the switching boost DC-DC converter, wherein the input inductor has a first terminal coupling to the power supply source and a second terminal coupling to the node between the high side switch and the low side switch; and
   further comprising coupling the first terminal of the input inductor and the second terminal of the input inductor of the switching boost DC-DC converter if the output voltage of the switching boost DC-DC converter is above a second predefined voltage level, wherein the second predefined voltage level is a sum of the desired boost DC-DC converter output voltage and a second voltage tolerance; and further comprising deactivating the high side switch and the low side switch if the output voltage of the switching boost DC-DC converter is above the second predefined voltage level.

2. The method of claim 1, wherein the boosting, by the input inductor, the input voltage provided by the power supply source occurs when the low side switch is active.

3. The method of claim 1, wherein the providing, by the input inductor, to the output capacitor the boosted voltage occurs when the high side switch is active.

* * * * *